US009857785B2

(12) United States Patent
Richard

(10) Patent No.: US 9,857,785 B2
(45) Date of Patent: Jan. 2, 2018

(54) ADJUSTABLE KNOCKDOWN ROLLERS FOR SUGARCANE HARVESTER

(71) Applicant: DEERE & COMPANY, Moline, IL (US)

(72) Inventor: Eric P. Richard, Thibodaux, LA (US)

(73) Assignee: Deere & Company, Moline, IL (US)

( * ) Notice: Subject to any disclaimer, the term of this patent is extended or adjusted under 35 U.S.C. 154(b) by 338 days.

(21) Appl. No.: 14/659,189

(22) Filed: Mar. 16, 2015

(65) Prior Publication Data
US 2015/0331408 A1 Nov. 19, 2015

Related U.S. Application Data

(60) Provisional application No. 61/994,037, filed on May 15, 2014.

(51) Int. Cl.
G05B 19/19 (2006.01)
A01D 45/10 (2006.01)

(52) U.S. Cl.
CPC ............ G05B 19/19 (2013.01); A01D 45/10 (2013.01); *G05B 2219/45003* (2013.01); *G05B 2219/45015* (2013.01)

(58) Field of Classification Search
CPC .......... G05B 19/19; G05B 2219/45003; G05B 2219/45015; A01D 45/10
See application file for complete search history.

(56) References Cited

U.S. PATENT DOCUMENTS

| | | |
|---|---|---|
| 3,945,177 A | 3/1976 | Scott et al. |
| 6,076,340 A | 6/2000 | Fowler |
| 6,272,819 B1 * | 8/2001 | Wendte ............... A01D 41/127 460/6 |
| 6,508,049 B1 * | 1/2003 | Cox ....................... A01D 45/10 56/10.2 R |
| 2006/0026939 A1 * | 2/2006 | Kormann ............. A01D 41/141 56/10.2 E |
| 2010/0154401 A1 * | 6/2010 | Sullivan, Jr. .......... E02F 9/2235 60/444 |
| 2011/0154793 A1 * | 6/2011 | Ernst ..................... A01D 57/22 56/94 |
| 2012/0110968 A1 * | 5/2012 | Hinds .................... A01D 45/10 56/53 |
| 2014/0257569 A1 * | 9/2014 | Yip ........................ G05B 15/02 700/275 |
| 2014/0290102 A1 * | 10/2014 | O'Donnell .............. E02F 3/435 37/403 |

OTHER PUBLICATIONS

John Deere, "Knockdown Roller" (Apr. 8, 2008) Retrieved from: http://manuals.deere.com/omview/OMNW00276_19/AG_T803324_117_19_08APR08_1.htm.*

* cited by examiner

*Primary Examiner* — Miranda Huang
*Assistant Examiner* — Brian T McMenemy
(74) *Attorney, Agent, or Firm* — Lorenz & Kopf, LLP

(57) ABSTRACT

A method and control system are disclosed for adjusting orientations of knockdown rollers for sugarcane harvesters. An upper knockdown roller may be moved along a first adjustment path using a first actuator. A lower knockdown roller may be moved along a second adjustment path using a second actuator. A substantially tangential alignment may be maintained for an outer diameter of the upper knockdown roller and an outer diameter of the lower knockdown roller with respect to a reference point along a cutting path of the base cutter assembly, during or after movement of the upper and lower knockdown rollers.

20 Claims, 9 Drawing Sheets

ADJUSTABLE KNOCKDOWN ROLLERS FOR SUGARCANE HARVESTER

CROSS-REFERENCE TO RELATED APPLICATION(S)

This application claims priority under 35 U.S.C. §119 to U.S. Provisional Application No. 61/994,037, filed May 15, 2014, the disclosure of which is incorporated herein by reference.

STATEMENT OF FEDERALLY SPONSORED RESEARCH OR DEVELOPMENT

Not applicable.

FIELD OF THE DISCLOSURE

This disclosure relates generally to sugarcane harvesting, including the adjustment of knockdown rollers for sugarcane plants.

BACKGROUND OF THE DISCLOSURE

In order to harvest sugarcane from a field, a sugarcane harvester may move along a sugarcane field in order to gather sugarcane plants for further processing. One or more knockdown rollers may be mounted at or near the front of the harvester in order to assist in aligning the plants for intake into the harvester. In certain harvesters, a front or upper knockdown roller may be oriented at a relatively forward and upward position, and a rear or lower knockdown roller may be oriented at a relatively rearward and downward position. Accordingly, as these harvesters move along a sugarcane field, sugarcane plants may be aligned for further processing by one or both of the upper knockdown roller and lower knockdown roller.

SUMMARY OF THE DISCLOSURE

A method and a control system are disclosed for adjusting knockdown rollers for sugarcane harvesters. According to one aspect of the disclosure, a first and second actuator may be activated. An upper knockdown roller may be moved along a first adjustment path using the first actuator. A lower knockdown roller may be moved along a second adjustment path using the second actuator. The upper and lower knockdown rollers may be moved separately or substantially simultaneously. During or after the moving of the upper and the lower knockdown rollers, a substantially tangential alignment may be maintained for an outer diameter of the upper knockdown roller and an outer diameter of the lower knockdown roller, with respect to reference point along a cutting path of the base cutter assembly.

In certain embodiments, the actuators may be activated via one or more input devices in a cab of the sugarcane harvester. The actuators may include hydraulic cylinders or other devices. The first adjustment path may be an arc defined by a support member pivotally attached to a frame of the sugarcane harvester. The second adjustment path may be an arc defined by a cradle pivotally attached to a frame of the sugarcane harvester.

In certain embodiments, the orientations of the upper and lower knockdown rollers may be identified based upon signals from, respectively, first and second sensors, and the tangential alignment may be maintained based upon the identified orientations. The lower knockdown roller may be maintained at an endpoint of the second adjustment path, thereby defining a boundary tangent line, and the upper knockdown roller may be moved past the boundary tangent line.

According to another aspect of the disclosure, a control system may include a support member supporting an upper knockdown drum, the support member being pivotally attached to the frame of a sugarcane harvester to define a first adjustment path for the upper knockdown drum. A cradle may rotatably support a lower knockdown drum, the cradle being pivotally attached to the frame of the sugarcane harvester to define a second adjustment path for the lower knockdown drum. One or more actuators may be attached to the upper and the lower knockdown drums and to the frame of the sugarcane harvester in order to move the upper and the lower knockdown drums, respectively, along the first and the second adjustment paths. A controller may be configured to activate the one or more actuators in order to simultaneously move the upper and lower knockdown rollers along, respectively, the first and second adjustment paths. The controller may be further configured to maintain, during the moving of the upper and the lower knockdown rollers, a substantially tangential alignment of an outer diameter of the upper knockdown roller with a tangent line extending between an outer diameter of the lower knockdown roller and a cutting path of the base cutter assembly.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
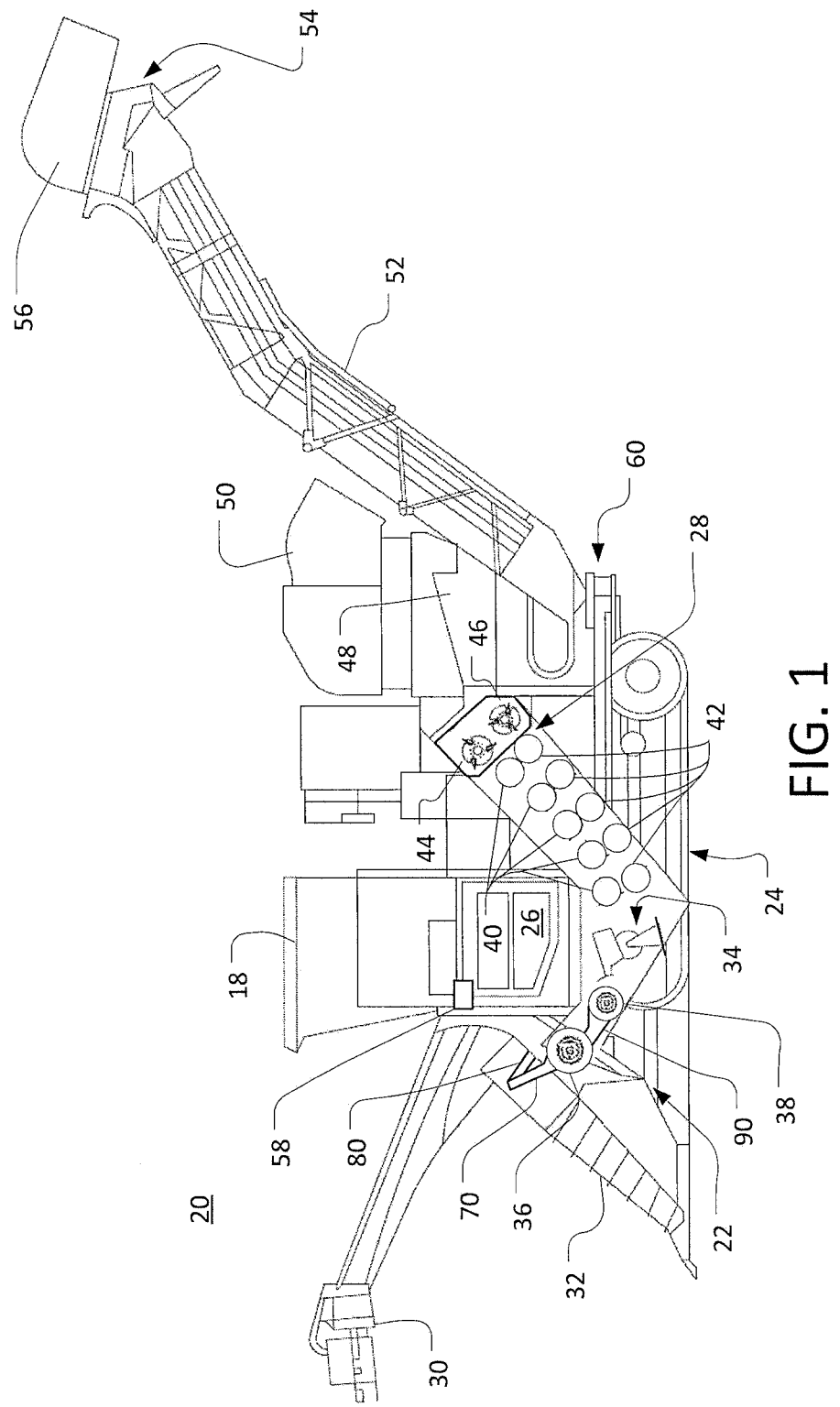
FIG. 1 is a side view of an example sugarcane harvester with a knockdown roller control system.

The following describes one or more example embodiments of the disclosed control system and method for adjusting the orientation of knockdown rollers for sugarcane harvesters, as shown in the accompanying figures of the drawings described briefly above. Various modifications to the example embodiments may be contemplated by one of skill in the art.

As noted above, knockdown rollers of various configurations may be utilized in order to guide and align sugarcane plants for further processing by a sugarcane harvester (e.g., for cutting of the sugarcane by a base cutter assembly and transport through the harvester for chopping of the sugarcane into billets). The orientation and condition of sugarcane plants in a given field, and among different fields, however, may vary considerably. For example, certain areas may exhibit generally upright sugarcane plants, while other areas may exhibit tangled and generally flattened "mats" of sugarcane plants. Similarly, certain sugarcane plants may be relatively brittle, such that aggressive contact with the plants (e.g., by a knockdown roller) may break the plants before they reach the base cutter assembly, while other sugarcane plants may be less brittle, and therefore more able to resiliently absorb various degrees of contact. Accordingly, it may be useful to provide a control system and method for adjusting various knockdown rollers in order to ensure that the contact of the rollers with particular sugarcane plants (e.g., plants of a particular orientation, brittleness, and so on) may be appropriately aggressive (or not aggressive).

Further, in various operations, it may be useful to ensure that a substantial portion of sugarcane plants entering the harvester are contacted—and thereby aligned for further processing—by both an upper (and more forwardly located) knockdown roller and a lower (and more rearwardly located) knockdown roller. Because of the generally elongated geometry of sugarcane plants, such two-roller contact may be facilitated, in various operations, by ensuring that the upper and lower knockdown rollers generally align along co-linear tangent lines, with respect to the outer diameters of the rollers and a shared reference point (e.g., a point along the cutting path of the associated base cutter assembly). (Such alignment may be referred to herein as "tangential" alignment of different rollers.) To this end, where the orientations of both upper and lower knockdown rollers are adjustable, it may be useful to provide a control system and method for ensuring that after adjustment of roller orientation the rollers are substantially tangentially aligned. In certain embodiments, it may also be useful to provide for continuous tangential alignment over a range of adjustment orientations for each of upper and lower knockdown rollers, including continuous tangential alignment during simultaneous movement of the two rollers. In this way, for example, an essentially infinite number of roller configurations may be obtained, while maintaining for each configuration, a tangential alignment of the upper and lower rollers.

As will become apparent from the discussion herein, the disclosed system and method may be used advantageously in a variety of settings and with a variety of machinery. In certain embodiments, referring now to FIG. 1, the disclosed system and method may be implemented with regard to a sugarcane harvester 20. It will be understood, however, that the disclosed system and method may be used for various other vehicles or non-vehicle platforms, including various sugarcane harvesters of different configurations or designs than the sugarcane harvester 20 of FIG. 1.

The harvester 20 is presented in a side view in FIG. 1, with the front of the harvester 20 facing to the left. Accordingly, certain right-side components of the harvester 20 may not be visible in FIG. 1. The harvester 20 may include a main frame 22 supported on track assemblies 24 or wheels (not shown), with a cab 18 to house an operator. An engine 26 may supply power for driving the harvester along a field and for powering various driven components of the harvester 20. In certain embodiments, the engine 26 may directly power a hydraulic pump (not shown) and various driven components of the harvester 20 may be powered by hydraulic motors (not shown) receiving hydraulic power from the hydraulic pump via an embedded hydraulic system (not shown).

A cane topper 30 may extend forward of the frame 22 in order to remove the leafy tops of sugarcane plants (not shown), and a set of crop dividers 32 (only the left-side divider 32 shown in FIG. 1) may then guide the remainder of the sugarcane toward internal mechanisms of the harvester 20 for processing. As the harvester 20 moves across a field, plants passing between the crop dividers 32 may be deflected downward by an upper knockdown roller 36 and a lower knockdown roller 38 before being cut near the base of the plants by a base cutter assembly 34 mounted on the main frame 22. Rotating disks, guides, or paddles (not shown) on the base cutter assembly 34 may further direct the cut ends of the plants upwardly and rearward within the harvester 20 toward successive pairs of upper and lower feed rollers 38 and 40. The feed rollers 38 and 40 may be rotatably supported by a chassis 28 (e.g., a welded extension of the frame 22), and may be rotatably driven by a hydraulic motor or other device (not shown) in order to convey the stalks toward chopper drums 44 and 46 for chopping into relatively uniform billets.

The chopper drums 44 and 46 may rotate in opposite directions in order to chop the passing stalks into billets and propel the billets into a cleaning chamber 48 at the base of a primary extractor 50. The primary extractor 50 may then utilize a powered fan to extract trash and debris from the cleaning chamber 48, while allowing the billets of sugarcane stalks to drop onto a loading elevator 52 with a forward end located at the bottom of the cleaning zone 48. The loading elevator 52 may then convey the cleaned billets upward to a discharge location 54, below a secondary extractor 56, where the billets may be discharged into a trailing truck or other receptacle (not shown).

In certain embodiments, one or more control devices, such as controller 58, may be included in (or otherwise associated with) the harvester 20. The controller 58, for example, may include one or more computing devices including various processor devices and various associated memory architectures. In certain embodiments, the controller 58 may additionally (or alternatively) include various other control devices such as various electro-hydraulic valves and hydraulic circuits, various electronic control circuits and devices (e.g., various power electronics devices), and so on. In certain embodiments, the controller 58 (or another control device) may be in communication with various switches, controls and other interfaces or input devices (not shown) in the cab 18, as well as with various sensors, actuators, or other devices (not shown in FIG. 1) distributed throughout the harvester 20. In certain embodiments, the controller 58 (or another control device) may be a remotely located control device that communicates with various devices and systems of the harvester 20 via wireless or other extended-distance communication means.

In certain embodiments, the upper knockdown roller 36 and the lower knockdown roller 38 may be attached to the frame 22 of the harvester 20 such that the respective rollers 36 and 38 may be moved continuously through particular adjustment paths. In certain embodiments, referring also to FIGS. 2 and 3, the rollers 36 and 38 may be pivotally attached to the frame 22, so as to define, respectively, generally arcuate adjustment path 62 with endpoints 62a and 62b and arcuate adjustment path 64 with endpoints 64a and 64b (see, e.g., FIG. 3). Generally, and as discussed in greater detail below, the disclosed control system and method may then control movement of the rollers 36 and 38 along the paths 62 and 64 (or alternative adjustment paths) so as to maintain a substantially tangential alignment of the two rollers 36 and 38, with respect to a particular reference point.

In certain embodiments, the upper knockdown roller 36 may include a drum 66, having various teeth 68 attached thereto. The drum 66 may be a generally cylindrical metal drum of various known configurations, or a drum of various other designs and materials. The teeth 68 may be laser-cut metal teeth, or teeth of various other types, and may be attached to the drum 66 in various known ways. The teeth 68 may generally help to engage sugarcane plants (not shown) in order to appropriately align the plants for further processing by the harvester 20. In certain embodiments, outer-most tips 68a (FIG. 3) of the teeth 68 may be viewed as defining an outer diameter for the upper roller 36, as the tips 68a may generally define the outermost points of the roller 36 that may contact the sugarcane plants. However, other reference points may additionally (or alternatively) be used. For example, the innermost point of indents 68b between the teeth 68 may be viewed as defining another outer diameter for the upper roller 36, as the indents 68b may generally define the innermost points of the teeth 68 that may contact the sugarcane plants. In certain embodiments, the drum 66 may have an outer diameter, measured at the tips 68a of the teeth 68, of approximately 16 inches.

The drum 66 may be mounted to the frame 22 in various ways such that the roller 36 is rotatably supported with respect to the frame 22 of the harvester 20, but may move along a particular adjustment path with respect to the frame 22. In certain embodiments, the drum 66 may be rotatably mounted to a support member such as support arm 70, which may include a pivot mount 72 at the opposite end of the support arm 70 from the roller 36 to pivotally support the drum 66 with respect to the frame 22. In certain embodiments, the pivot mount 72 may include a set of pins (or other pivot members) extending to either side of the support arm 70, which pins may be pivotally supported by the frame 22 in various known ways. The pivot mount 72 may be rotatably attached to the frame 22 such that the roller 36 may be generally constrained to movement only along arcuate adjustment path 62 (see FIG. 3). In certain embodiments, the pivot mount may be attached to a support structure 80 (see FIG. 2) of the frame 22, which may extend forward of the cab 18 between the crop dividers 32 (see FIG. 1). (For clarify of presentation in FIG. 2, only one half of the support structure 80 is depicted.) It will be understood, however, that other configurations may be possible.

Other configurations for the support of the upper knockdown roller 36 may also be possible. In certain embodiments, various linkage assemblies or other mounting devices (not shown) may be utilized to rotatably support the roller 36 with respect to the frame 22. In certain embodiments, one or more such linkage assemblies may be configured such that the roller 36 moves along a generally arcuate path similar to the adjustment path 62, or may be configured such that the roller 36 moves along an adjustment path of a different configuration. In certain embodiments, various mechanical or other stops (not shown) may be provided in order to limit the range of movement of the roller 36 along the adjustment path 62, or to mark various intermediary positions along the adjustment path 62.

In certain embodiments, a hydraulic or other actuator may be configured to move the roller 36 along the adjustment path 62. For example, the hydraulic cylinder 74 may be pivotally attached, at opposite ends of the cylinder 74, to the frame 22 and to the support arm 70, such that extension and retraction of the cylinder 74 causes the support arm 70 to pivot about the pivot mount 72 and thereby causes the upper knockdown roller 36 to move along the adjustment path 62. Various hydraulic control lines 76 may provide power and control to the cylinder 74 and may accordingly extend from the cylinder 74 to various pumps (not shown) and control devices such as the controller 58 (see FIG. 1).

In certain embodiments, rotation of the upper knockdown roller 36 may be driven by various power sources included within the knockdown roller 36. For example, hydraulic motors 110 may be mounted within the roller 36 such that activation of the motors 110 may cause the roller 36 to rotate with respect to the support arm 70. In certain embodiments, various hydraulic lines (not shown) for the powering and control of the motors 110 may extend out of the roller 36 and along the interior of the support arm 70, such that the hydraulic lines are appropriately protected from impacts and debris. From the support arm 70, these lines may then extend, as appropriate, to various hydraulic pumps (not shown) and control devices such as the controller 58 (FIG. 1).

In certain embodiments, one or more sensors may be associated with the upper knockdown roller 36 in order to provide signals indicating the current position of the roller 36 along the adjustment path 62 (or other relevant information). These signals may be relayed to a control device such as the controller 58 (FIG. 1) for appropriate processing. A rotational sensor 78, for example, may measure the rotation of the arm 70 around the pivot mount 72 in order to provide to the controller 58 a signal indicating the current angular orientation of the arm 70, with respect to a reference orientation. The sensor 78 may include, for example, a Hall effect rotational sensor, a rotational encoder, an optical sensor, or another sensor of various known configurations. The sensor 78 may communicate with the controller 58 (or another control device) in various known ways, including electrically, hydraulically, wirelessly, and so on.

Figure 2:
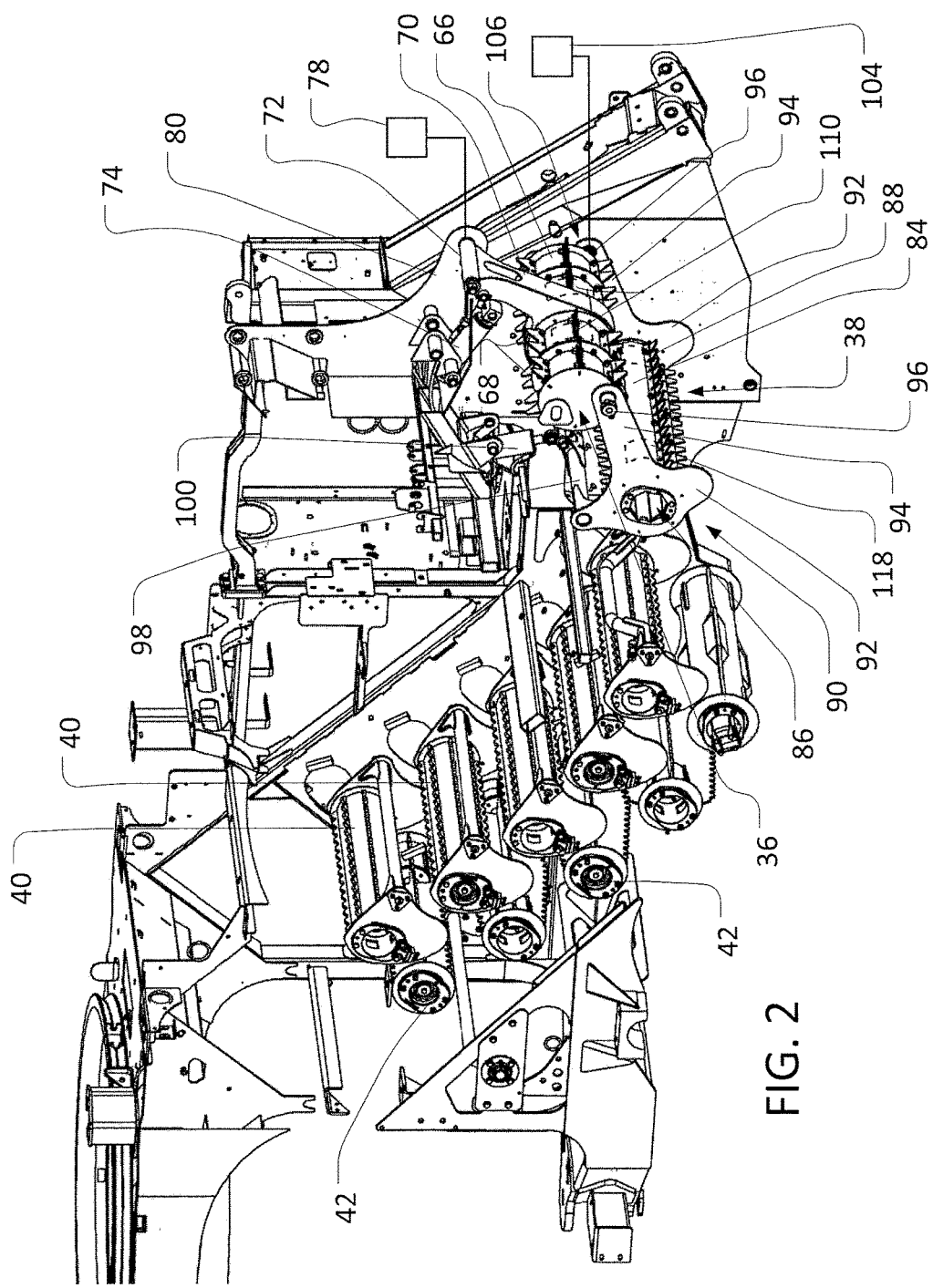
FIG. 2 is a perspective view of certain components of the knockdown roller control system, as mounted to the sugarcane harvester of FIG. 1.
Figure 3:
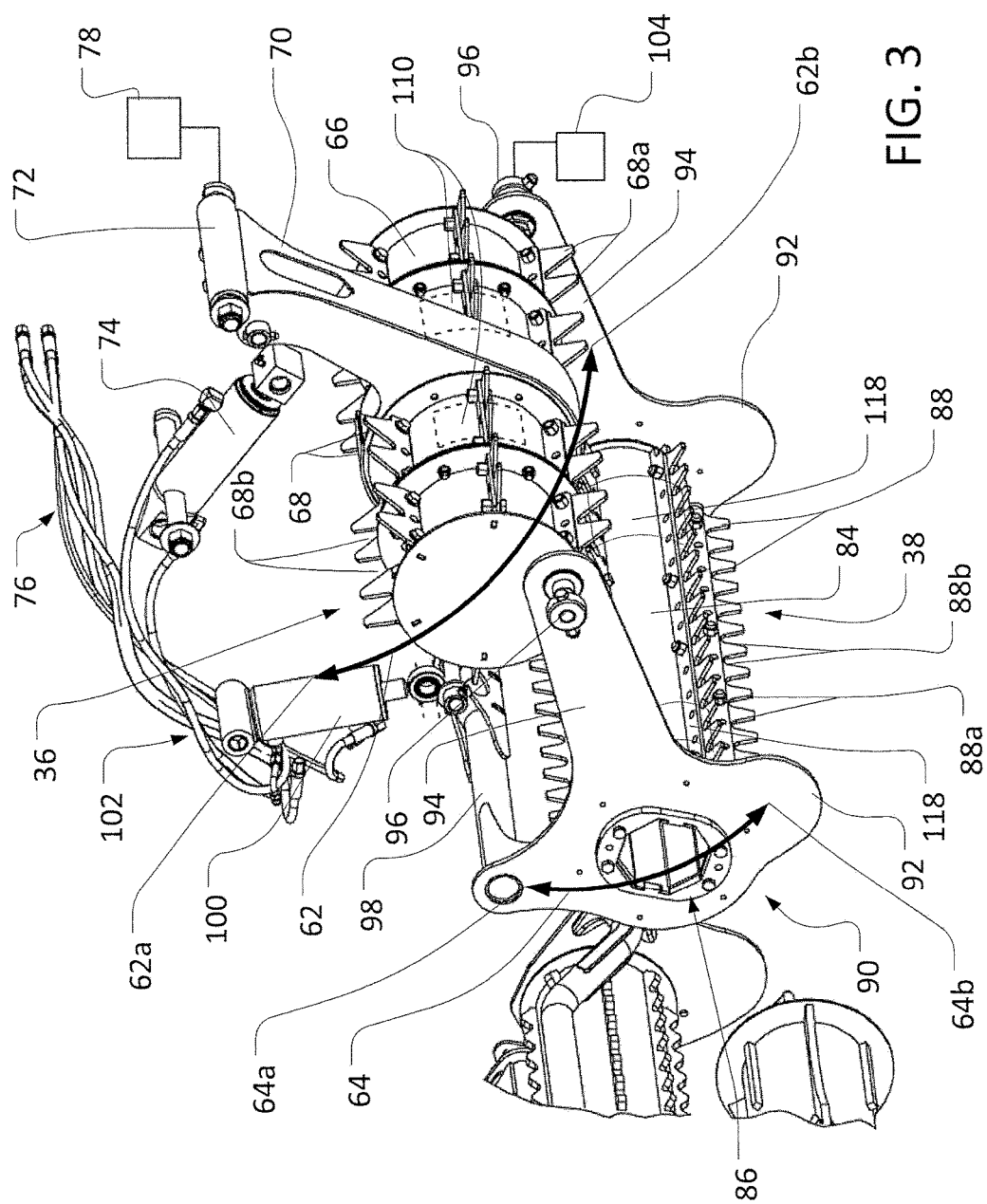
FIG. 3 is an enlarged view of certain components of the knockdown roller control system, as depicted in FIG. 2.

Still referring to FIGS. 2 and 3, in certain embodiments, the lower knockdown roller 38 may include a cylindrical drum 84, having various teeth 88. The drum 84 may be a metal drum of various known configurations. The teeth 88 may be laser-cut metal teeth, or teeth of various other types, and may be attached to the drum 84 in various known ways. The teeth 88 may generally help to engage sugarcane plants (not shown) in order to appropriately align the plants for further processing by the harvester 20. In certain embodiments, outer-most tips 88a (FIG. 3) of the teeth 88 may be viewed as defining an outer diameter for the lower roller 38, as the tips 88a may generally define the outermost points of the roller 38 that may contact the sugarcane plants. However, other reference points may additionally (or alternatively) be used. For example, the innermost point of indents 88b between the teeth 88 may be viewed as defining another outer diameter for the lower roller 38, as the indents 88b may generally define the innermost points of the teeth 88 that may contact the sugarcane plants. In certain embodiments, the roller 38 may have an outer diameter, measured at the tips 88a of the teeth 88, of approximately 14 inches.

The drum 84 may be mounted to the frame 22 in various ways such that the roller 38 is rotatably supported with respect to the frame 22 of the harvester 20, but may still move along a particular adjustment path with respect to the frame 22. In certain embodiments, the drum 84 may be rotatably mounted to a cradle 90 (or other support structure), which may generally include opposite side members 92 connected by one or more cross members 98. The drum 84 may be mounted to the side members 92 for rotation in various known ways. Pivot arms 94 may extend from side members 92 to pivot members 96 (e.g., metal pins with appropriate attachment mechanisms), which may be rotatably attached to the frame 22 such that the roller 38 may be generally constrained to move only along arcuate adjustment path 64 (see FIG. 3). In certain embodiments, the pivot members 96 may be attached to a support structure 106 of the frame 22 (see FIG. 2) that is generally behind the crop dividers 32 (see FIG. 1) and below the pivot mount 72. In certain embodiments, the support structure 106 may be a pivot mount on the frame 22. It will be understood, however, that other configurations may be possible.

Other configurations for the support of the lower knockdown roller 38 may also be possible. In certain embodiments, various linkage assemblies or other mounting devices (not shown) may be utilized to rotatably support the roller 38 with respect to the frame 22. In certain embodiments, one or more such linkage assemblies may be configured such that the roller 38 moves along a generally arcuate path similar to the adjustment path 64, or may be configured such that the roller 38 moves along an adjustment path of a different configuration. In certain embodiments, various mechanical or other stops (not shown) may be provided in order to limit the range of movement of the roller 38 along the adjustment path 64, or to mark various intermediary positions along the adjustment path 64.

In certain embodiments, a hydraulic or other actuator may be configured to move the roller 38 along the adjustment path 64. For example, the hydraulic cylinder 100 may be pivotally attached, at opposite ends of the cylinder 100, to the frame 22 and to the cross member 98 (or other features of the cradle 90), such that extension and retraction of the cylinder 100 causes the cradle 90 to pivot about the pivot members 96 and thereby causes the lower knockdown roller 38 to move along the adjustment path 64. Various hydraulic control lines 102 may provide power and control to the cylinder 100 and may accordingly extend from the cylinder 100 to various pumps (not shown) and control devices such as the controller 58 (FIG. 1).

In the embodiments depicted, separate actuators (e.g., hydraulic cylinders 74 and 100) may be utilized to separately move the upper and lower knockdown rollers 36 and 38. In certain embodiments, however, a single actuator (or various actuators in parallel) may be utilized to move both of the rollers 36 and 38.

In certain embodiments, rotation of the lower knockdown roller 38 may be driven by various power sources included within the knockdown roller 38. For example, hydraulic motors 118 may be mounted within the roller 38 such that activation of the motors 118 may cause the roller 38 to rotate with respect to the cradle 90. In certain embodiments, the motors 118 may be end-ported motors, whereby the motors 118 may be seated sufficiently far within the drum 84 that only the power and control lines (not shown) of the motors 118, but not components of the motors 118 themselves, may extend through the end openings 86 of the drum 84. Accordingly, space between the side sheets 92 and the frame 22 of the harvester 20 may be needed only for the power and control lines of the motors 118, and the teeth 88 and the drum 84 may be configured to extend over the entire (or nearly the entire) distance between the side members 92. This may, for example, allow the lower knockdown roller 38 to present a wider effective engagement surface to the sugarcane plants and may increase the effectiveness of the operation of the roller 38 accordingly. From the end openings 86 of the drum 84, the power and control lines for the motors 118 may extend, as appropriate, to various hydraulic pumps (not shown) and control devices such as the controller 58 (FIG. 1).

In certain embodiments, one or more sensors may be associated with the lower knockdown roller 38 in order to provide signals indicating the current position of the roller 38 along the adjustment path 64 (or other relevant information). These signals may be relayed to a control device such as the controller 58 (FIG. 1) for appropriate processing. A rotational sensor 104, for example, may measure the rotation of the arm 70 around the pivot mount 72 in order to provide to the controller 58 a signal indicating the current angular orientation of the arm 70, with respect to a reference orientation. The sensor 104 may include, for example, a Hall effect rotational sensor, a rotational encoder, an optical sensor, or another sensor of various known configurations. The sensor 104 may communicate with the controller 58 (or another control device) in various known ways, including electrically, hydraulically, wirelessly, and so on.

Figure 4:
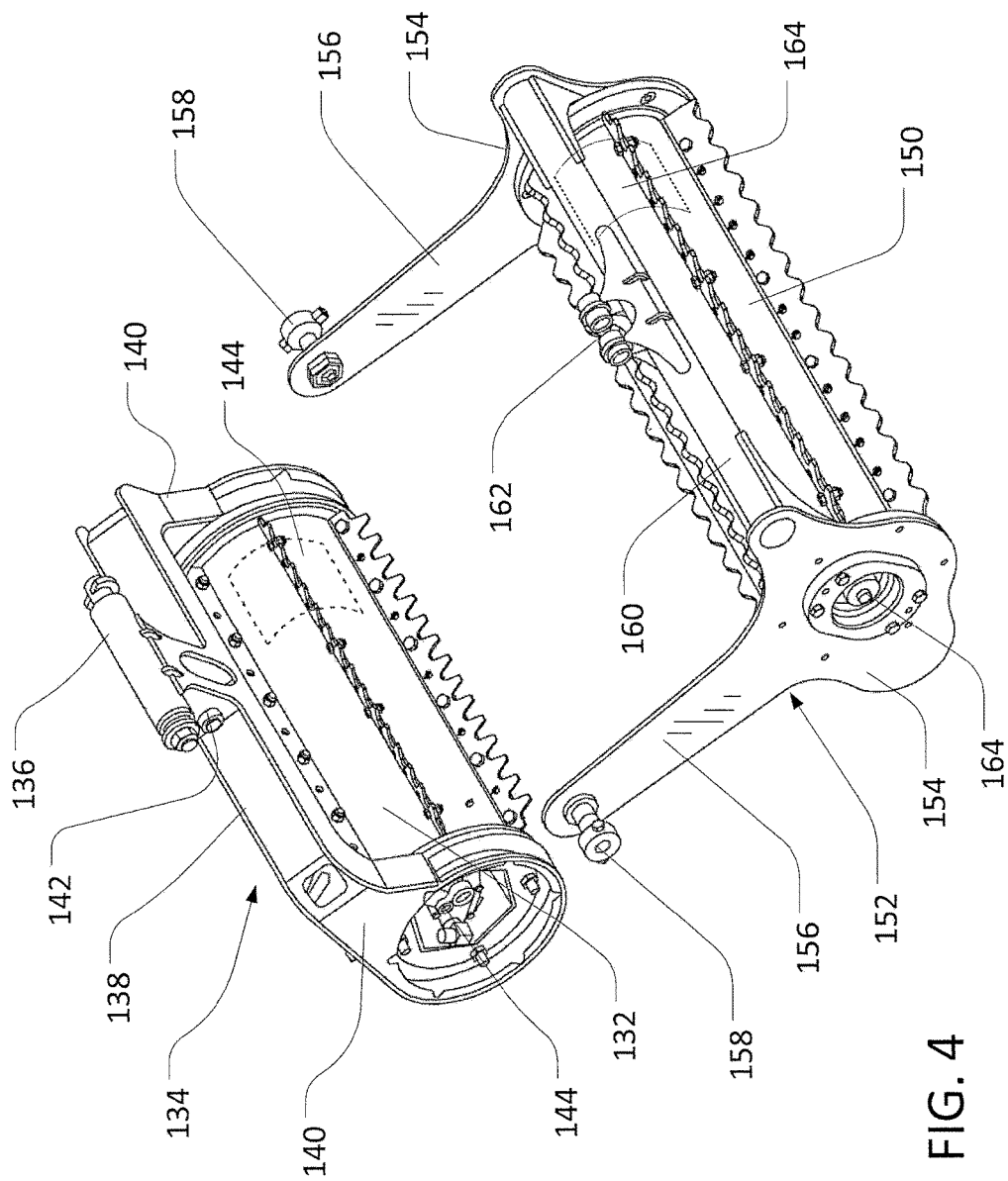
FIG. 4 is a perspective view of certain components of another embodiment of the knockdown roller control system.
Figure 5:
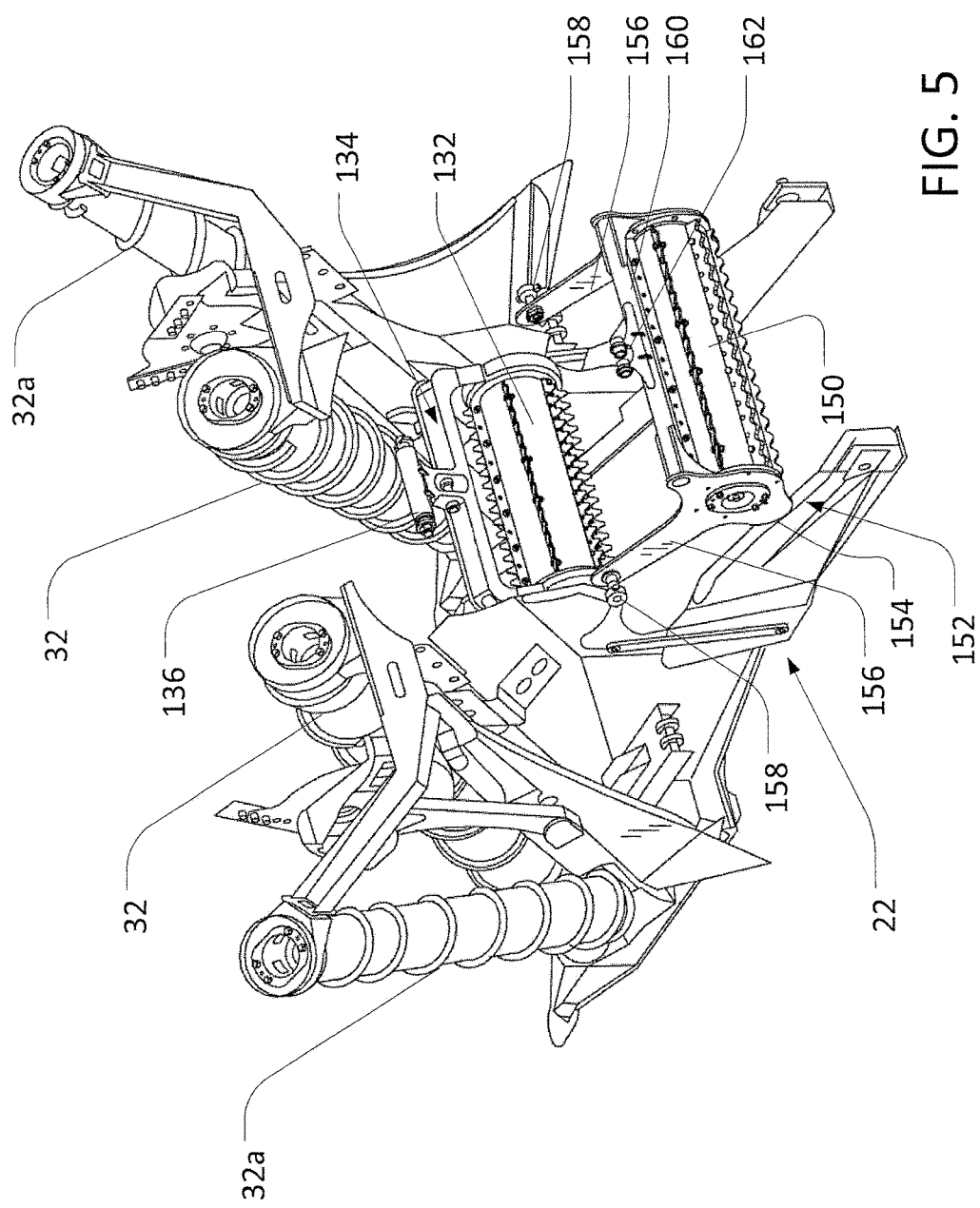
FIG. 5 is perspective view of the knockdown roller control system components of FIG. 4 oriented in a front portion of the sugarcane harvester of FIG. 1.

Other configurations may also be possible. Referring to FIGS. 4 and 5, for example, a different upper knockdown roller 132 may be rotatably supported by a support member 134, which may include side arms 140 connected by a cross member 138. Support arm 142 may connect the cross member 138 to a pivot mount 136, which may be pivotally mounted to the frame 22 of the harvester 20 in the position shown in FIG. 5. As depicted in FIG. 5, for example, the pivot mount 136 may be mounted to the frame 22 generally behind and below the crop dividers 32. For clarity, the support structures of frame 22 to which the pivot mount 136 may be mounted have been omitted from FIG. 5.

The support arm 142, cross member 138 and side arms 140 may define a partially open internal space (not shown), through which various power and control lines for the rotation of the knockdown roller 132 may be routed. For example, various hydraulic lines (not shown) may extend through the support arm 142, the cross member 138 and the side arms 140 to power and control hydraulic motors 144. In certain embodiments, a hydraulic (or other) actuator may attach to the support arm 142 (or other feature of the support member 134) in order to pivot the roller 132 about the pivot mount 136.

Similarly, a different lower knockdown roller 150 may be rotatably supported by a cradle 152, which may generally include opposite side members 154 connected by one or more cross members 160. Pivot arms 156 may extend from side members 154 to pivot members 158, which may be rotatably attached to the frame 22 in the position shown in FIG. 5 (e.g., behind and below the pivot mount 136). Various motors (e.g., hydraulic motors 164) may be provided in order to drive the rotation of the roller 150. In certain embodiments, a hydraulic (or other) actuator may attach to the cross member 160 (e.g., at hydraulic cylinder mount 162) in order to pivot the roller 150 about the pivot members 158. For clarity, the support structures 80 and 106 of frame 22 to which the pivot members 158 may be mounted have been omitted from FIG. 5.

Figure 6:
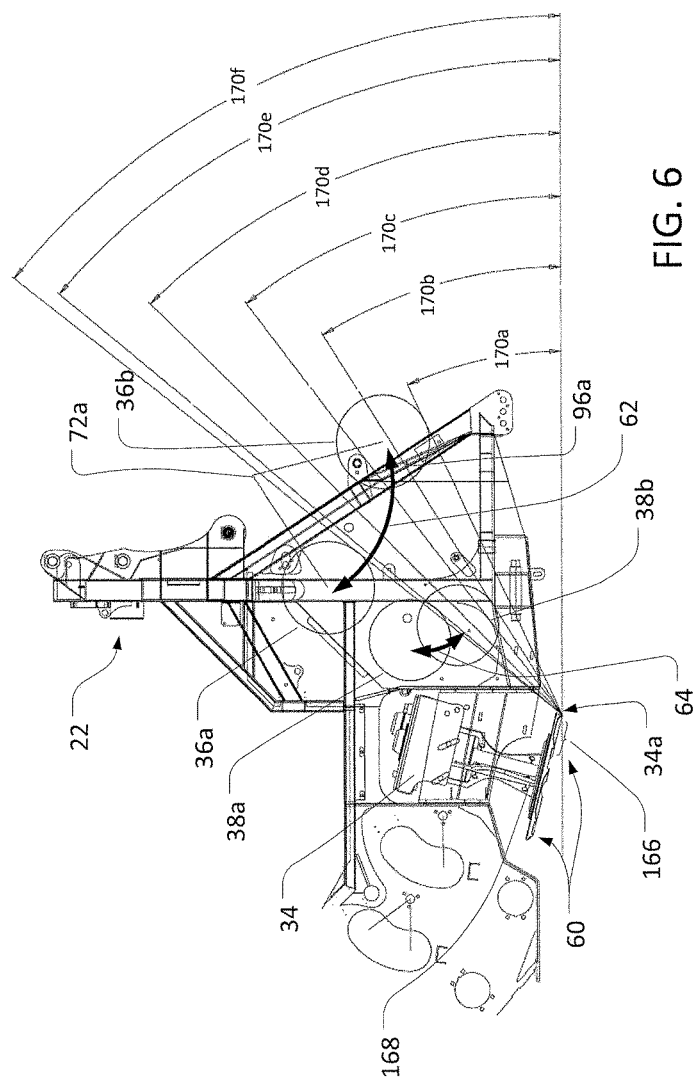
FIGS. 6-8 are a schematic views of aspects of knockdown roller movement as implemented by a knockdown roller control system.
Figure 7:
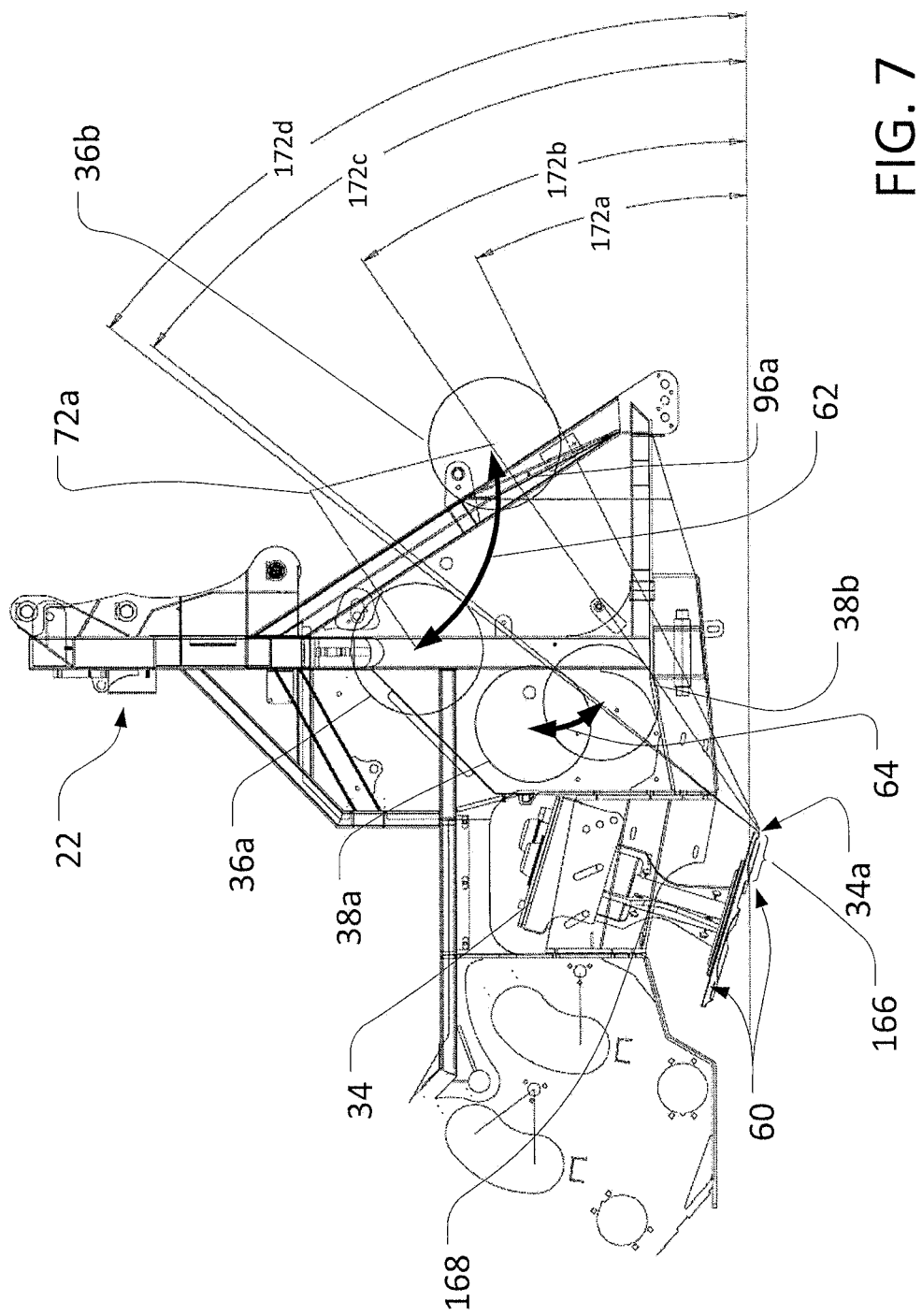
Figure 8:
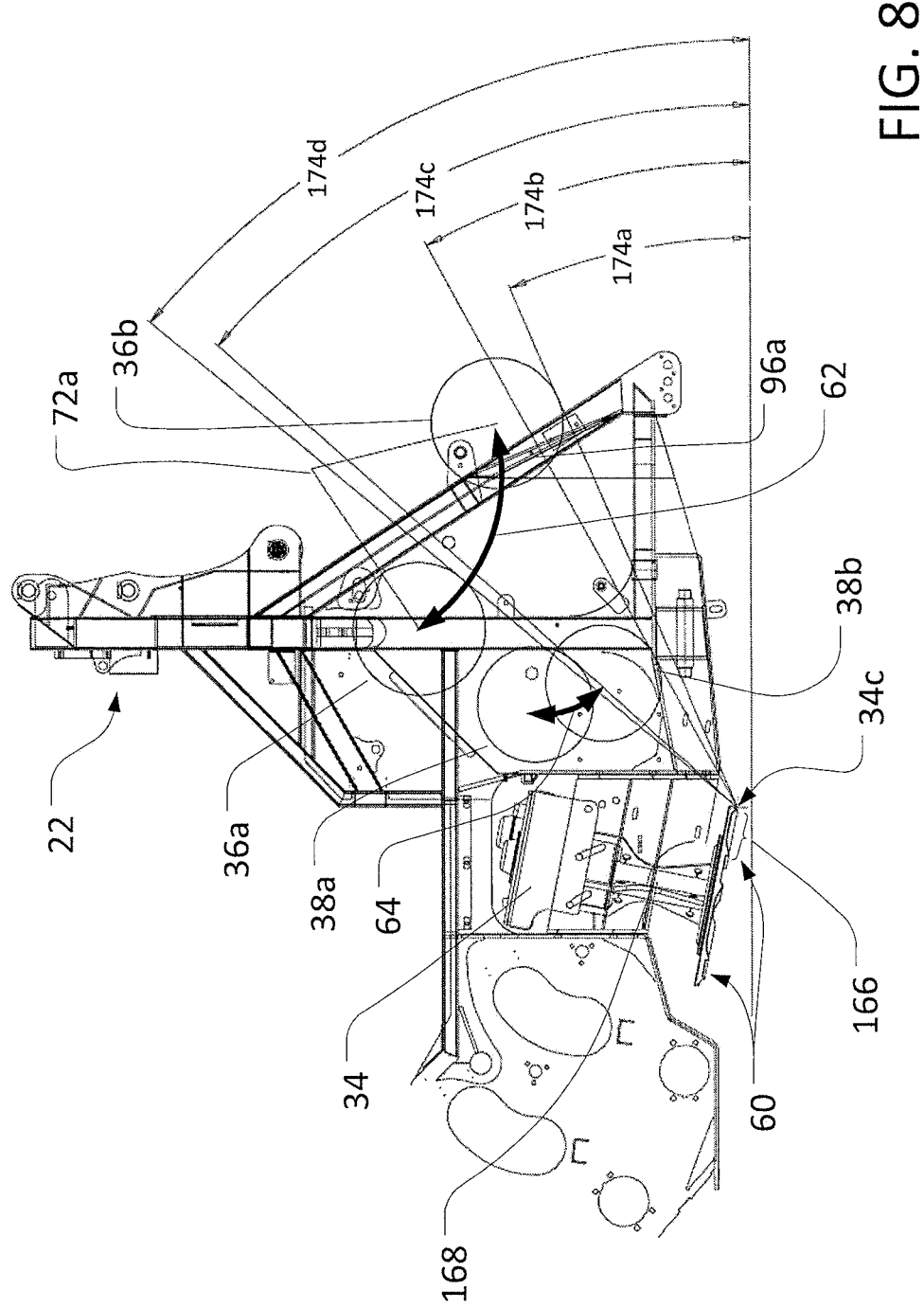

As noted above, for certain operations, it may be useful to ensure that tangent lines between the outer diameters of the upper and lower knockdown rollers 36 and 38, respectively, (e.g., as measured at the tips 68a, 88a or indents 68b, 88b of the teeth 68 and 88), respectively, and a common reference point are substantially co-linear (i.e., to ensure that the rollers 36 and 38 are substantially tangentially aligned). Referring also to FIGS. 6 through 8, in certain implementations, the base cutter assembly 34 may provide an appropriate common reference point for these tangent lines. For example, with respect to a generally extended and nominally straight sugarcane stalk, if tangent lines between outer diameters of the rollers 36 and 38 and a portion of the base cutter assembly 34 are substantially co-linear, the sugarcane stalk may be contacted by both of the rollers 36 and 38 at approximately the same time that the sugarcane stalk is severed from the ground by the base cutter assembly 34. This may generally result in favorable alignment and guidance of the sugarcane stalk by the rollers 36 and 38 for further processing by the harvester 20. Accordingly, in certain embodiments, a point within a path of cutting blades 60 of the base cutter assembly 34 may provide an appropriate reference point for the tangential alignment of the rollers 36 and 38. In certain embodiments, as described in greater detail below, such a reference point may change locations, with regard to the frame 22 of the harvester 20, when the base cutter assembly 34 is itself adjusted to different orientations, or when different blades 60 or blade configurations are utilized, and so on.

Referring in particular to FIG. 6, a first orientation of the base cutter assembly 34 is depicted, in which the assembly is inclined forward at approximately 14 degrees. The base cutter assembly 34 may include two (or more) basecutter legs 168 oriented on either side of a front-to-back axis of the harvester 20, each basecutter leg 168 including with a set of blades 60, such that the blades 60 of both legs 168 generally trace overlapping cutting paths 166 as the blades 60 are rotated by the assembly 34. In the examples discussed herein, the most forward point 34*a* of these cutting paths 166 may be utilized as a reference point for determining tangential alignment of the knockdown rollers 36 and 38. It will be understood, however, that other reference points may also be utilized, including various other reference points within the general cutting paths 166 of the blades 60 such as the intersection point of the cutting paths 166 of the two legs 168.

As discussed above, the upper knockdown roller 36 may be pivotally mounted to the frame 22 such that the roller 36 may be moved an adjustment path by various means (e.g., actuation of a hydraulic cylinder). For clarity of presentation, the particular mounting and actuation mechanisms for the roller 36 are not depicted in FIGS. 6 through 8. It can be seen, however, that the roller 36 may be pivoted about pivot point 72*a* along the arcuate adjustment path 62 between a farthest rearward endpoint position 36*a* and a farthest forward endpoint position 36*b*. Similarly, it can be seen that the roller 38 may be pivoted about pivot point 96*a* along the arcuate adjustment path 64 between a uppermost endpoint position 38*a* and a lowermost endpoint position 38*b*. (It will be understood that the pivot points 72*a* and 96*a*, the adjustment paths 62 and 64, and the positions 36*a*, 36*b*, 38*a*, and 38*b* are presented as examples, and that other configurations and ranges of movements may be possible).

Various movements of the rollers 36 and 38 along the adjustment paths 62 and 64 may be described below. These movements may be executed based upon manual input (e.g., by an operator within the cab 18), may be executed automatically under the control of the controller 58 (see FIG. 1), including as based upon signals from the sensors 78 and 104 (see FIG. 3), or may be executed based upon a combination of operator input and automatic control. Various of the contemplated movements of the roller 36 and 38 may be executed simultaneously (e.g., as controlled by an operator or by the controller 58) or may be executed in various sequences, including sequences in which either of the rollers 36 or 38 is moved first and sequences in which the rollers 36 and 38 are separately moved in alternating fashion. Further, although particular examples may describe movement of the rollers 36 and 38 in a particular direction along the respective adjustment paths 62 and 64, it will be understood that movement of the rollers 36 and 38 in either direction along the paths 62 and 64 may be possible, including movement of the rollers 36 and 38 along the respective paths 62 and 64 in opposite directions.

It can be seen, with respect to FIG. 6, that a tangent line extending through the outer diameter of the upper knockdown roller 36 (within the front, lower quadrant of the roller 36) to the reference point 34*a* when the roller 36 is at the position 36*b* (see angle 170*a*) does not intercept the lower knockdown roller 38. The position 36*b* may be seen as a somewhat aggressive orientation of the upper knockdown roller 36, which may be useful, for example, in the harvesting of heavily matted and flattened sugarcane. In certain implementations, the angle 170*a* may be approximately 25 degrees, with respect to a horizontal reference line extending through the reference point 34*a*.

As the upper knockdown roller 36 is moved rearward along the adjustment path 62 from the position 36*b*, the outer diameter of the roller 36 may eventually align with a tangent line defined by the reference point 34*a* and the angle 170*b*. In certain implementations, the angle 170*b* may be approximately 32 degrees. It can be seen that the tangent line for the roller 36 along the angle 170*b* may be substantially co-linear with a tangent line through the reference point 34*a* and a point along the front, lower quadrant of the outer diameter of the lower knockdown roller 38. Accordingly, the upper and lower knockdown rollers 36 and 38 may be viewed as substantially tangentially aligned (e.g., tangentially aligned to within ±5 degrees) with respect to the reference point 34*a* (i.e., with regard to the most forward point of the cutting path of the blades 60). As the tangent line defined by the angle 170*b* corresponds to the endpoint position 38*b* of the lower roller 38, this line may also be viewed as a boundary tangent line for the roller 38 and the corresponding tangential alignment may represent the first such alignment that may be possible as the roller 36 is moved from the endpoint position 36*b*.

As the upper knockdown roller 36 continues to move rearward along the adjustment path 62, in order to maintain a tangential alignment of the two rollers 36 and 38 with respect to the reference point 34*a*, it may be appropriate to also move the lower knockdown roller 38 upward along the adjustment path 64 from the position 38*b*. In certain implementations, the above-noted movements of the rollers 36 and 38 may be sequential, with one of the rollers 36 or 38 being moved to a first position and the other of the rollers 36 or 38 then being moved to a second position that is tangentially aligned with the first position. In certain implementations, the above-noted movements of the rollers 36 and 38 may be simultaneous, such that a substantially tangential alignment of the rollers may be maintained over a range of positions along, respectively, the adjustment paths 62 and 64. Such simultaneous movement may accordingly transition the knockdown rollers 36 and 38 through a succession of tangential alignments, including at various intermediary points such as those defined by angle 170*c* (e.g., approximately 38 degrees) or angle 170*d* (e.g., approximately 45 degrees). In certain implementations, these (or other) intermediary points may represent pre-determined set points for the rollers 36 and 38 (e.g., as may be suitable for particular expected sugarcane types or conditions). In certain implementations, no specific intermediary set points may be provided.

As the lower knockdown roller 38 is moved along the adjustment path 64, the lower knockdown roller 38 may reach its upper endpoint position 38*a*, which may be correspond to the boundary tangent line for the roller 38, as defined by the angle 170*e* (e.g., approximately 50 degrees).

In certain implementations, the upper knockdown roller 36 may be moved past this boundary tangent line (i.e., as defined by the angle 170e), including until the roller 36 reaches the endpoint 36a of the adjustment path 62, which may correspond to a boundary tangent line defined by the angle 170f (e.g., approximately 51 degrees). For example, in a simultaneous, tangentially aligned movement of both of the rollers 36 and 38 (e.g., as described above), the lower knockdown roller 38 may reach the endpoint position 38a before the upper knockdown roller 36 reaches its upper endpoint position 36a. As appropriate, the lower knockdown roller 38 may then be maintained at its boundary tangent line (i.e., at the line defined by the angle 170e) while the upper knockdown roller 36 is moved past that line (and out of tangential alignment with the lower roller 38). Similar, but reversed-direction, movement may also be possible with respect to the boundary tangent line of the lower roller 36 defined by the angle 170a.

As noted above, other orientations of the base cutter assembly 34 may be possible. For example, the base cutter assembly 34 may be pivoted with respect to the frame 22 in order to provide a more or less aggressive cutting angle for sugarcane plants than is depicted in FIG. 6. Accordingly, different orientations of the cutting path defined by the blades 60 of the base cutter assembly 34 may be possible, which may result in different locations of the rollers 36 and 38 for the tangential alignment of the rollers 36 and 38.

Referring in particular to FIG. 7, for example, the base cutter assembly 34 may be tilted farther forward than the orientation of FIG. 6 (e.g., to an angle of approximately 17 degrees), thereby providing a different reference point 34b at the most forward point of the cutting path 166 of the blades 60. As noted above, the orientations of the knockdown rollers 36 and 38 for tangential alignment may also change accordingly. For example, the boundary tangent line for the upper knockdown roller 36 at position 36b may be defined by the reference point 34b and an angle 172a (e.g., approximately 26 degrees). Similarly, the boundary tangent line for the lower knockdown roller 38 at position 38b (and the corresponding location for the tangential alignment of roller 36) may be defined by an angle 172b (e.g., approximately 35 degrees). Further, a boundary tangent line for the lower knockdown roller 38 at position 38a may be defined by an angle 172c (e.g., approximately 51 degrees) and a boundary tangent line for the upper knockdown roller 36 at position 36a may be defined by an angle 172d (e.g., approximately 52 degrees).

Referring in particular to FIG. 8, the base cutter assembly 34 may also, for example, be tilted farther backward than the orientation of FIG. 6 (e.g., to an angle of approximately 11 degrees), thereby providing another different reference point 34c at the most forward point of the cutting path 166 of the blades 60. Again, the orientations of the knockdown rollers 36 and 38 for tangential alignment may also change accordingly. For example, the boundary tangent line for the upper knockdown roller 36 at position 36b may be defined by the reference point 34c and an angle 174a (e.g., approximately 24 degrees). Similarly, the boundary tangent line for the lower knockdown roller 38 at position 38b (and the corresponding location for the tangential alignment of roller 36) may be defined by an angle 174b (e.g., approximately 29 degrees). Further, a boundary tangent line for the lower knockdown roller 38 at position 38a may be defined by an angle 174c (e.g., approximately 48 degrees) and a boundary tangent line for the upper knockdown roller 36 at position 36a may be defined by an angle 174d (e.g., approximately 50 degrees).

The particular endpoint positions of the adjustment path of a knockdown roller (e.g., endpoint positions 36a, 36b, 38a, and 38b) may be selected based upon various factors and considerations. In certain embodiments, for example, the inner endpoint position 36a of the upper knockdown roller 36 may be selected so that the roller 36 tends to contact sugarcane plants in a field before the plants strike the cab 18 (or other portions of the harvester 20). In certain embodiments, the outer endpoint position 36b may be selected so that the roller 36 cannot be positioned along the adjustment path 62 in an orientation in which the roller 36 will too aggressively contact sugarcane plants. Similar considerations (and others) may additionally (or alternatively) inform selection of the endpoint positions 38a and 38b of the lower knockdown roller 38.

In the embodiments depicted in FIGS. 6 through 8, the various endpoint positions 36a, 36b, 38a and 38b are configured such that the upper knockdown roller 36 may be moved along the adjustment path 62 past the boundary tangent lines of the lower knockdown roller 38 (i.e., the tangent lines between an outer diameter of the lower roller 38 and the relevant reference point 34a, 34b, or 34c). Alternatively, the endpoint positions may be configured such that one or both of the boundary tangent lines for the upper knockdown roller 36 and the lower knockdown roller 38 are co-linear, with respect to a particular reference point (e.g., point 34a, 34b or 34c). Alternatively, the endpoint positions may be configured such that the upper knockdown roller 36 may not reach one or both of the boundary tangent lines of the lower knockdown roller 38 by moving along the adjustment path 62 (i.e., such that one or both of the boundary tangent lines of the roller 36 fall between the boundary tangent lines of the roller 38). In such a configuration, it will accordingly be understood that the lower knockdown roller 38 may be moved along the adjustment path 64 past the boundary tangent lines of the upper knockdown roller 36.

In the various embodiments depicted in FIGS. 6 through 8, it may be necessary to determine the relative orientation of the base cutter assembly 34 in order to implement tangential alignment of the rollers 36 and 38 with respect to the base cutter assembly 34. In certain implementations, the relative orientation of the base cutter assembly 34 may be determined automatically (e.g., based upon various sensors (not shown)), based upon operator input, or otherwise. In certain implementations, a fixed reference point (e.g., a particular location of the frame 22) rather than variable reference points 34a, 34b, and 34c may be alternatively (or additionally) utilized in order to implement appropriate tangential alignment.

In certain implementations, the permitted range of movement of the rollers 36 and 38 along the adjustment paths 62 and 64 (i.e., the location of the endpoint positions 36a, 36b, 38a, and 38b) may be automatically adjusted depending on various factors. In certain implementations, for example, the controller 58 may determine the current orientation of the base cutter assembly 34 (e.g., by way of various sensors (not shown) or operator input) and may then automatically limit movement of the rollers 36 and 38 between particular endpoint positions that are determined based upon that current orientation of the assembly 34. As such, for example, the precise location of the endpoint positions 36a, 36b, 38a, and 38b may sometimes depend upon the current location of the reference point 34a, 34b, or 34c.

Various operations for alignment (and other movement) of the upper knockdown roller 36 and the lower knockdown roller 38 (or other pairs of rollers), including various of the operations described above, may be implemented as part of a roller adjustment ("RA") method. Such a method may be implemented automatically (e.g., as controlled by the controller 58), manually (e.g., as controlled by an operator via various interfaces and input devices (not shown)), or as a combination of automatic and manual operations (e.g., as controlled manually by an operator via various input devices and automatically by the controller 58). It will be understood, accordingly, that an RA method may be implemented using various computing devices or by various hydraulic, electronic, mechanical, electro-hydraulic, electro-mechanical, or other control devices, in various combinations.

Figure 9:
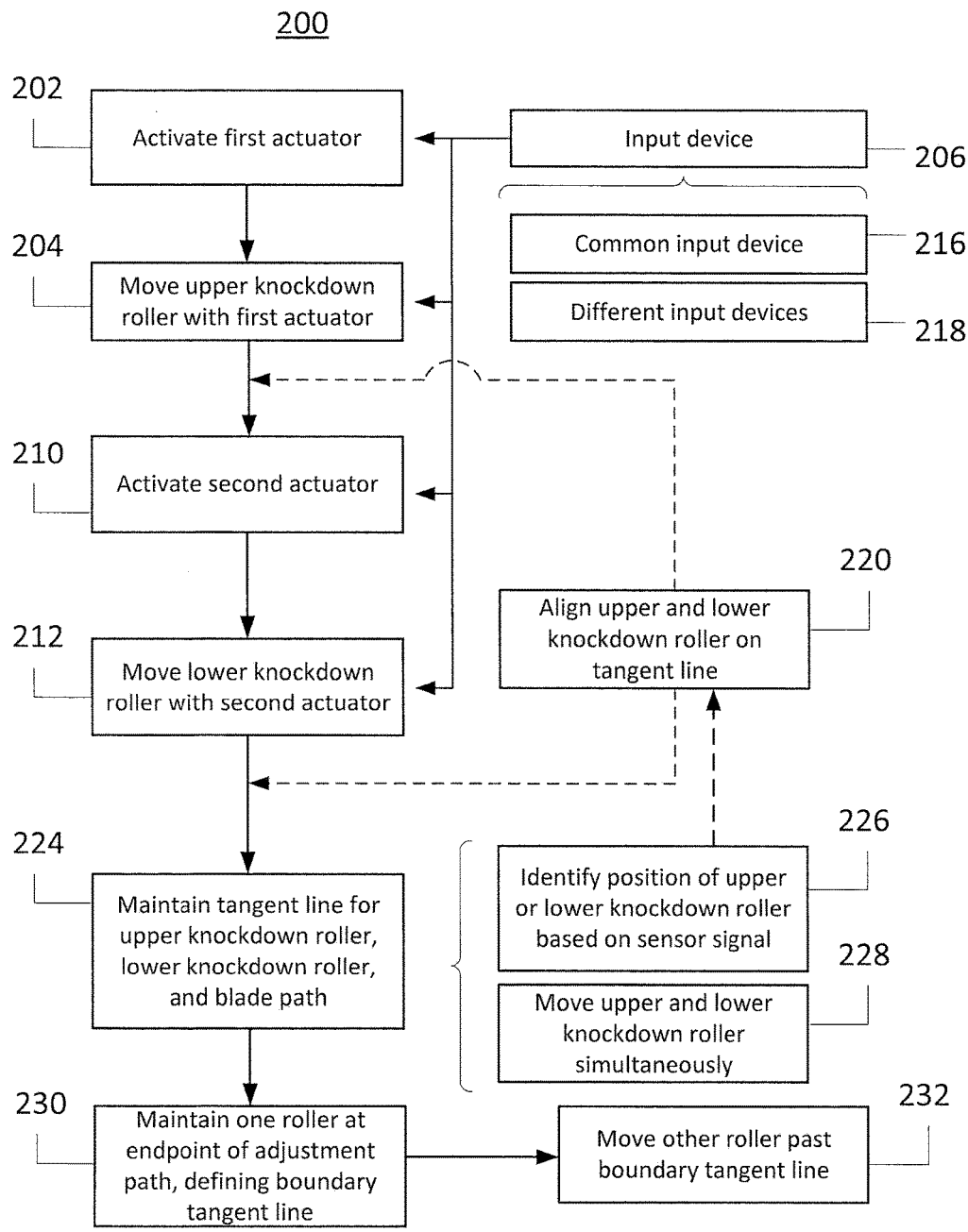
FIG. 9 is a diagrammatic view of a control method implemented by a knockdown roller control system.

Referring also to FIG. 9, various operations of an example RA method 200 are represented. In certain implementations, the RA method 200 may include activating 202 a first actuator, such as hydraulic cylinder 74. The first actuator may be activated 202 in various ways. In certain implementations, an operator may engage with one of various input devices 206 in the cab 18 in order to select the first actuator and thereby activate 202 the first actuator for further operations. For example, an operator may flip a switch or toggle a lever corresponding to the hydraulic cylinder 74 in order to activate 202 that cylinder 74 (e.g., in order to open or close a relevant valve, engage a relevant pump, prime a relevant pressure chamber, and so on). Alternatively (or additionally), the controller 58 (or another control device) may activate 202 the first actuator. In certain implementations, the controller 58 may automatically activate 202 the first actuator based upon the occurrence of a particular event (e.g., the start of a harvesting operation, the start of forward movement of the harvester 20, and so on). In certain implementations, the controller 58 may activate 202 the first actuator based upon input from an operator (e.g., flipping of a switch or toggling of a lever within the cab 18).

Once activated 202, the first actuator may then be utilized to move 204 the upper knockdown roller 36 along the adjustment path 62. In certain implementations, the first actuator may move 204 the upper knockdown roller 36 automatically. For example, as directed by the controller 58, the first actuator, once activated 202, may move 204 the roller 36 to a predetermined set point along the adjustment path 62 (see e.g., FIG. 6). In certain implementations, the first actuator may move 204 the upper knockdown roller 36 based upon manual input. For example, the first actuator, once activated 202, may move 204 the roller 36 along the adjustment path 62 in a direction indicated by the toggling of a control lever (not shown), and may continue to move 204 the roller 36 so long as the lever is toggled (or until the relevant endpoint position 36a or 36b has been reached).

The RA method 200 may further include activating 210 a second actuator, such as hydraulic cylinder 100. The second actuator may be activated 210 in various ways. In certain implementations, an operator may engage with one of various input devices 206 in the cab 18 in order to select the second actuator and thereby activate 210 the second actuator for further operations. For example, an operator may flip a switch or toggle a lever corresponding to the hydraulic cylinder 100 in order to activate 210 that cylinder 100 (e.g., in order to open or close a relevant valve, engage a relevant pump, prime a relevant pressure chamber, and so on). Alternatively (or additionally), the controller 58 (or another control device) may activate 210 the second actuator. In certain implementations, the controller 58 may automatically activate 210 the second actuator based upon the occurrence of a particular event (e.g., the start of a harvesting operation, the start of forward movement of the harvester 20, the activation 202 or moving 204 of the upper knockdown roller 36, and so on). In certain implementations, the controller 58 may activate 210 the second actuator based upon input from an operator (e.g., flipping of a switch or toggling of a lever within the cab 18).

Once activated 210, the second actuator may then be utilized to move 212 the lower knockdown roller 38 along the adjustment path 64. In certain implementations, the second actuator may move 212 the lower knockdown roller 38 automatically. For example, as directed by the controller 58, the second actuator, once activated 210, may move 212 the roller 38 to a predetermined set point along the adjustment path 64. In certain implementations, the second actuator may move 212 the lower knockdown roller 38 based upon manual input. For example, the second actuator, once activated 210, may move 212 the roller 38 along the adjustment path 64 in a direction indicated by the toggling of a control lever (not shown), and may continue to move 212 the roller 38 so long as the lever is toggled (or until the relevant endpoint position 38a or 38b has been reached).

In certain implementations, the input device(s) 206 for activating 202 (and, in certain implementations, moving 204) the upper knockdown roller 36 may be a common input device 216, which may also be utilized for activating 210 (and, in certain implementations, moving 212) the lower knockdown roller 38. For example, an operator may engage a particular lever or switch (not shown) in order to activate 202 and 210 (and, potentially, to move 204 and 212) both of the rollers 36 and 38. In certain implementations, different input devices 218 may be used for the different knockdown rollers 36 and 38, or for various different operations of the RA method 200 (e.g., for activating 202 and for moving 204 the upper knockdown roller 38). For example, an operator may engage separate levers or switches (not shown) in order to separately activate 202 and 210 (and, potentially, to separately move 204 and 212) the rollers 36 and 38

The RA method 200 may further include tangentially aligning 220 (or at least substantially tangentially aligning 220) the upper and lower knockdown rollers 36 and 38. As described in greater detail above (see, e.g., FIGS. 6 through 8), the roller 36 and 38 may be viewed as tangentially aligned if a tangent line between an outer diameter of the roller 36 and a reference point (e.g., reference point 34a in FIG. 6) is substantially co-linear with a tangent line between an outer diameter of the roller 38 and the same reference point.

The rollers 36 and 38 may be tangentially aligned 220 at various points during the operations of the RA method 200. In certain implementations, the rollers 36 and 38 may be aligned 220 before one or both of the rollers 36 and 38 are moved 204 and 212. For example, the rollers 36 and 38 may be in an aligned 220 configuration at the start of the RA method 200 (or at another starting time), or the roller 36 may be moved 204 into alignment 220 with the roller 38 before the roller 38 is also moved 212. In certain implementations, the upper roller 36 may be moved 204 to a final position for a particular operation, then the lower roller 38 may be moved 212 into alignment 220 with that final position of the upper roller 36 (or vice versa). In certain implementations, the rollers 36 and 38 may be continuously aligned 220 as both of the rollers 36 and 38 are moved 204 and 212 (i.e., as the rollers are simultaneously moved 228). For example, referring to FIG. 7, if the upper roller 36 starts at the endpoint position 36a and the lower roller 38 starts at the endpoint position 38a, the upper roller may be moved 204 along the adjustment path 62 (e.g., automatically, as controlled by the controller 58) until it is tangentially aligned 220 with the lower roller 38 along the boundary tangent line for the lower roller 38 defined by the reference point 34b and the angle 172e. The lower roller 38 may then be moved 228 simultaneously with the movement 204 of the upper roller 36 (e.g., automatically, as controlled by the controller 58) such that the two rollers 36 and 38 are maintained 224 in substantially tangential alignment 220 for all (or a portion) of the movement 204, 212.

The upper and lower knockdown rollers 36 and 38 may be maintained 224 in substantially tangential alignment before, during or after various movement 204 and 212 (or various simultaneous movement 228) of the rollers 36 and 38. In certain implementations, the rollers 36 and 38 may be maintained 224 in substantially tangential alignment 220 based upon signals from various sensors. For example, the controller 58 may received signals from the sensors 78 and 104 and may identify 226 the current positions of the rollers 36 and 38 along the adjustment paths 62 and 64, respectively, based upon those signals. The controller 58 may then adjust the movement 204 and 212 of the rollers 36 and 38 as appropriate in order to appropriately align 220 the rollers 36 and 38 (as necessary), and in order to maintain 224 the alignment 220 of the rollers 36 and 38. As noted above, the noted adjustment of roller position and maintenance 224 of roller alignment 220, as based upon the identification 226 of the current positions of the rollers 36 and 38 based upon sensor signals, may be implemented during simultaneous movement 228 of the rollers 36 and 38 or otherwise (e.g., in order to determine the appropriate target position for movement 212 of the lower roller 38 after the upper roller 36 has already been moved 204).

In certain implementations, the rollers 36 and 38 may be tangentially aligned 220 based upon manual input. For example, an operator may separately activate various different input devices 218 in order to separately move 204 and 212, and appropriately align 220, the upper and lower rollers 36 and 38. (In certain implementations, an operator may alternatively use the input devices 218, or a common input device 216 to simultaneously move 228 the rollers 36 and 38.) In certain implementations, the controller 58 may assist this manual alignment 220 of the roller 36 and 38 by providing various indicators to the operator. For example, based upon signals from various sensors (e.g., the sensors 78 and 104), the controller 58 may identify 226 the current position of the rollers 36 and 38 during a manual movement 204, 212 and alignment 220 operation and may provide a corresponding indicator (e.g., a visual or aural indicator) to the operator indicating whether the rollers 36 and 38 are tangentially aligned 220 or not. For example, a LED light in the cab 18 may be lit or a buzzer may sound when the controller 58 determines that the rollers 36 and 38 are appropriately aligned 220. Based upon such an indicator (or other factors), the operator may accordingly determine that he has moved 204 and 212 (or simultaneously moved 228) the rollers 36 and 38 into alignment 220. Further, the operator may use such an indicator during further movement 204, 212 or 228 of the rollers 36 and 38 in order to attempt to maintain 224 a tangential alignment 220 of the rollers 36 and 38 during the further movement 204, 212 or 228 (or otherwise).

In certain implementations, one roller (e.g., the upper roller 36) may be moved past a boundary tangent line of the other roller (e.g., the lower roller 38). As depicted in FIG. 7, for example, the adjustment path 62 for the upper roller 36 may allow the upper roller 36 to be moved past the boundary tangent line for the lower roller 38 (as indicated by the angle 172b). In certain implementations, accordingly, the RA method 200 may include maintaining 230 one roller (e.g., the lower roller 38) at a boundary tangent line (e.g., as indicated by the angle 172b) and moving 232 the other roller (e.g., the upper roller 36) past that boundary tangent line. For example, in an automatic and simultaneous movement 228 of the rollers 36 and 38 (e.g., as guided by the controller 58) toward, respectively, the endpoint positions 36b and 38b, once the lower roller 38 has reached the endpoint position 38b, the lower roller 38 may be maintained 230 at that position 38b while the upper roller 36 is moved 232 further toward the endpoint position 36b. (It will be understood, in such an implementation, that the rollers 36 and 38 may no longer be tangentially aligned 220 once the upper roller 36 is moved 232 past the boundary tangent line of the lower roller 38.)

As will be appreciated by one skilled in the art, certain aspects of the disclosed subject matter may be embodied as a method, system, (e.g., a work vehicle control system included in sprayer 10) or computer program product. Accordingly, certain embodiments may be implemented as hardware, as software (including firmware, resident software, micro-code, etc.) or as a combination of software and hardware aspects. Furthermore, certain embodiments may take the form of a computer program product on a computer-usable storage medium having computer-usable program code embodied in the medium.

Any suitable computer usable or computer readable medium may be utilized. The computer usable medium may be a computer readable signal medium or a computer readable storage medium. A computer-usable, or computer-readable, storage medium (including a storage device associated with a computing device or client electronic device) may be, for example, but is not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that can contain, or store a program for use by or in connection with the instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be non-transitory and may be any computer readable medium that is not a computer readable storage medium and that can communicate, propagate, or transport a program for use by or in connection with an instruction execution system, apparatus, or device.

Aspects of certain embodiments are described herein with reference to flowchart illustrations and/or block diagrams of methods, apparatus (systems) and computer program products according to embodiments of the invention. It will be understood that each block of any flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. For example, the terms "upper," "lower," and the like may be used with respect to the relative orientation of a particular embodiment, but may not be intended to limit the disclosure to that orientation nor embodiment. As used herein, the singular forms "a", "an" and "the" are intended to include the plural forms as well, unless the context clearly indicates otherwise. It will be further understood that any use of the terms "comprises" and/or "comprising" in this specification specifies the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various other implementations are within the scope of the following claims.

What is claimed is:

1. A method for adjusting orientations of an upper knockdown roller and a lower knockdown roller of a sugarcane harvester having a base cutter assembly for severing sugarcane plants from the ground, the method comprising:
    providing a first actuator for moving the upper knockdown roller along a first adjustment path, the first adjustment path including two first-path endpoints;
    providing a second actuator for moving the lower knockdown roller along a second adjustment path, the second adjustment path including two second-path endpoints;
    one or more of:
    activating the first actuator to move the upper knockdown roller with respect to the base cutter assembly along the first adjustment path from a first initial position to a first position using, at least in part, the first actuator; and
    activating the second actuator to move the lower knockdown roller with respect to the base cutter assembly along the second adjustment path from a second initial position to a second position using, at least in part, the second actuator; and
    with at least one of the upper and lower knockdown rollers oriented, respectively, between the two first-path endpoints and the two second-path endpoints, maintaining a substantially tangential alignment of a diameter of the upper knockdown roller and a diameter of the lower knockdown roller, with respect to a reference point along a cutting path of the base cutter assembly, the reference point being at the same location with respect to the base cutter assembly for the first and second initial positions and the first and second positions.

2. The method of claim 1, wherein at least one of the first actuator and the second actuator is activated via an input device in a cab of the sugarcane harvester.

3. The method of claim 2, wherein the first and second actuators are each activated based upon an input to a common input device in the cab of the sugarcane harvester.

4. The method of claim 2, wherein the first and second actuators are activated, respectively, based upon separate inputs to different input devices in the cab of the sugarcane harvester.

5. The method of claim 1, further comprising:
    identifying at least one of a first orientation of the upper knockdown roller along the first adjustment path and a second orientation of the lower knockdown roller along the second adjustment path;
    wherein the identifying of the at least one of the first and second orientations is based upon, respectively, a first signal from a first sensor associated with the upper knockdown roller and a second signal from a second sensor associated with the lower knockdown roller; and
    wherein the substantially tangential alignment is maintained based upon, at least in part, the identified at least one of the first orientation and second orientations.

6. The method of claim 1, further comprising:
    subsequent to the maintaining of the substantially tangential alignment, maintaining the lower knockdown roller at an endpoint of the second adjustment path, the lower knockdown roller thereby defining a boundary tangent line extending between the diameter of the lower knockdown roller and the reference point along the cutting path; and moving the upper knockdown roller using, at least in part, the first actuator, such that a portion of the diameter of the upper knockdown roller crosses the boundary tangent line.

7. The method of claim 1, wherein the first adjustment path includes an arc defined, at least in part, by a support member pivotally attached to a frame of the sugarcane harvester, the support member rotatably supporting the upper knockdown roller.

8. The method of claim 1, wherein the second adjustment path includes an arc defined, at least in part, by a cradle pivotally attached to a frame of the sugarcane harvester, the cradle rotatably supporting the lower knockdown roller.

9. The method of claim 1, wherein the moving of the upper knockdown roller by the first actuator occurs substantially simultaneously with the moving of the lower knockdown roller by the second actuator, the substantially tangent alignment being maintained during the substantially simultaneous moving of the upper and lower knockdown rollers.

10. A control system for adjusting orientations of an upper knockdown roller and a lower knockdown roller of a sugarcane harvester having a frame and a base cutter assembly for severing sugarcane plants from the ground, the control system comprising:
a support member supporting the upper knockdown drum, the support member including at least one pivot mount pivotally attached to the frame of the sugarcane harvester, the support member and the pivot mount thereby defining a first adjustment path for the upper knockdown roller, the first adjustment path including two first-path endpoints;
a cradle rotatably supporting the lower knockdown roller, the cradle including one or more pivot members pivotally attached to the frame of the sugarcane harvester, the cradle and the pivot members thereby defining a second adjustment path for the lower knockdown roller, the second adjustment path including two second-path endpoints;
at least one actuator attached to the upper and lower knockdown rollers and to the frame of the sugarcane harvester, the at least one actuator configured to move the upper and lower knockdown rollers, respectively, along the first and second adjustment paths; and
a controller configured to:
activate the at least one actuator;
at least one of:
move the upper knockdown roller with respect to the base cutter assembly along the first adjustment path from a first initial position to a first position using, at least in part, the at least one actuator; and
move the lower knockdown roller with respect to the base cutter assembly along the second adjustment path from a second initial position to a second position using, at least in part, the at least one actuator; and
with at least one of the upper and lower knockdown rollers oriented, respectively, between the two first-path endpoints and the two second-path endpoints, maintain a substantially tangential alignment of a diameter of the upper knockdown roller and a diameter of the lower knockdown roller, with respect to a reference point along a cutting path of the base cutter assembly, the reference point being the same with respect to the base cutter assembly for the first and second initial positions and the first and second positions.

11. The control system of claim 10, wherein the at least one actuator includes at least one hydraulic cylinder pivotally attached to at least one of the support member and the cradle.

12. The control system of claim 11, wherein the at least one actuator includes a first hydraulic cylinder pivotally attached to the support member and a second hydraulic cylinder pivotally attached to the cradle.

13. The control system of claim 11, wherein the moving of the upper knockdown roller occurs substantially simultaneously with the moving of the lower knockdown roller, the substantially tangent alignment being maintained during the substantially simultaneous moving of the upper and lower knockdown rollers.

14. The control system of claim 10, further comprising:
a first sensor associated with the upper knockdown roller, the first sensor being in communication with the controller; and
a second sensor associated with the lower knockdown roller, the second sensor being in communication with the controller;
wherein the controller is further configured to move the upper knockdown roller along the first adjustment path based upon, at least in part, a first signal from the first sensor; and
wherein the controller is further configured to move the lower knockdown roller along the second adjustment path based upon, at least in part, a second signal from the first sensor.

15. The control system of claim 10, wherein the controller is further configured to activate the at least one actuator based upon at least one input to at least one input device in a cab of the sugarcane harvester.

16. The control system of claim 15, wherein the at least one actuator includes a first actuator for moving the upper knockdown roller and a second actuator for moving the lower knockdown roller; and
wherein the controller is further configured to activate the first actuator based upon a first input to a first input device in the cab and to activate the second actuator based upon a second input to a second input device in the cab.

17. The control system of claim 10, wherein the controller is further configured to:
maintain one of the lower knockdown roller and the upper knockdown roller at an endpoint, respectively, of the second adjustment path and the first adjustment path, subsequent to the maintaining of the substantially tangential alignment, the one of the lower knockdown roller and the upper knockdown roller thereby defining a boundary tangent line extending between the reference point along the cutting path and the diameter of the one of the lower knockdown roller and the upper knockdown roller; and
move an other of the lower knockdown roller and the upper knockdown roller using, at least in part, the at least one actuator, such that a portion of the diameter of the other of the lower knockdown roller and the upper knockdown roller crosses the boundary tangent line.

18. A method for adjusting alignment of an upper knockdown roller and a lower knockdown roller of a sugarcane harvester having a base cutter assembly for severing sugarcane plants from the ground, the method comprising:
activating a first actuator;

moving the upper knockdown roller with respect to the base cutter assembly along a first adjustment path to a first position on the first adjustment path using, at least in part, the first actuator;

activating a second actuator; and moving the lower knockdown roller with respect to the base cutter assembly along a second adjustment path to a second position along the second adjustment path using, at least in part, the second actuator;

wherein one of the first position and the second position includes one of any number of positions along, respectively, the first adjustment path or the second adjustment path;

wherein an other of the first position and the second position includes an other position along, respectively, the first adjustment path or the second adjustment path, whereby the moving of the upper knockdown roller to the first position and the moving of the lower knockdown roller to the second position substantially aligns a first tangent line extending between a diameter of the upper knockdown roller and a cutting path of the base cutter assembly with a second tangent line extending between a diameter of the lower knockdown roller and the cutting path of the base cutter assembly; and wherein the first and second tangent lines intersect a common reference point of the base cutter assembly along the cutting path.

19. The method of claim 18, further comprising:

identifying at least one of a first orientation of the upper knockdown roller along the first adjustment path during the moving of the upper knockdown roller and a second orientation of the lower knockdown roller along the second adjustment path during the moving of the lower knockdown roller;

wherein the identifying of the at least one of the first and second orientations is based upon, respectively, a first signal from a first sensor associated with the upper knockdown roller and a second signal from a second sensor associated with the lower knockdown roller; and wherein at least one of the moving of the upper knockdown roller to the first position and the moving of the lower knockdown roller to the second position is based upon, at least in part, the identifying of the at least one of the first and second orientations.

20. The method of claim 18, wherein the first adjustment path includes an arc defined, at least in part, by a support member pivotally attached to a frame of the sugarcane harvester, the support member rotatably supporting the upper knockdown roller; and wherein the second adjustment path includes an arc defined, at least in part, by a cradle pivotally attached to the frame of the sugarcane harvester, the cradle rotatably supporting the lower knockdown roller.

* * * * *